(12) United States Patent
Ishimi

(10) Patent No.: US 7,729,223 B2
(45) Date of Patent: Jun. 1, 2010

(54) RECORDING METHOD FOR DYE-BASED RECORDABLE DVD MEDIUM AND RECORDING APPARATUS

(75) Inventor: Tomomi Ishimi, Numazu (JP)

(73) Assignee: Ricoh Company, Ltd., Tokyo (JP)

( * ) Notice: Subject to any disclaimer, the term of this patent is extended or adjusted under 35 U.S.C. 154(b) by 726 days.

(21) Appl. No.: 11/709,896

(22) Filed: Feb. 21, 2007

(65) Prior Publication Data

US 2007/0195674 A1 Aug. 23, 2007

(30) Foreign Application Priority Data

Feb. 22, 2006 (JP) .............................. 2006-044944
Jan. 29, 2007 (JP) .............................. 2007-018055

(51) Int. Cl.
*G11B 20/10* (2006.01)
(52) U.S. Cl. ................... 369/59.11; 369/47.51; 369/288
(58) Field of Classification Search ........................ None
See application file for complete search history.

(56) References Cited

U.S. PATENT DOCUMENTS

| 2005/0201243 A1 | 9/2005 | Ishimi et al. |
| 2006/0062117 A1 | 3/2006 | Noguchi et al. |
| 2006/0098547 A1 | 5/2006 | Horikawa et al. |

FOREIGN PATENT DOCUMENTS

| EP | 1515314 A1 | 3/2005 |
| EP | 1585116 A2 | 10/2005 |
| EP | 1607945 A1 | 12/2005 |
| JP | 2001-155339 | 6/2001 |
| JP | 2001-176073 | 6/2001 |
| JP | 2001-243626 | 9/2001 |
| JP | 2001-273636 | 10/2001 |
| JP | 2002-63721 | 2/2002 |
| JP | 2002-298415 | 10/2002 |

(Continued)

OTHER PUBLICATIONS

G. Langereis: "Surface Response Methodology for Write Strategy Optimisation in Optical Drives", *Japanese Journal of Applied Physics*, vol. 43, No. 8A, Aug. 10, 2004, pp. 5623-5629, XP-002432289.

(Continued)

*Primary Examiner*—Paul Huber
(74) *Attorney, Agent, or Firm*—Cooper & Dunham LLP

(57) ABSTRACT

A recording method for dye-based recordable DVD medium which includes recording shortest marks on a recording layer primarily containing an organic dye using a simple rectangular wave pulse; recording marks each having the second shortest or still longer mark length using one pulse of which the front and rear edges are highly energized for a given time; and controlling the optical energy for irradiating rear edge or backward of the pulse with a cooling pulse to be 0.1 mW or less for a given time, wherein when the recording power of the front and rear edges of the respective pulses is represented by $P_1$ and the recording power of intermediate pulse between the pulse front edge and the pulse rear edge is represented by $P_2$, $P_1/P_2$ is set to be greater when $P_1$ is a low power, and $P_1/P_2$ is set to be smaller when $P_1$ is a high power.

20 Claims, 8 Drawing Sheets

FOREIGN PATENT DOCUMENTS

| | | |
|---|---|---|
| JP | 2004-272983 | 9/2004 |
| JP | 2004-303400 | 10/2004 |
| JP | 2004-303401 | 10/2004 |
| JP | 2005-25867 | 1/2005 |
| JP | 2005-100579 | 4/2005 |
| JP | 2005-243202 | 9/2005 |
| JP | 2005-243208 | 9/2005 |
| JP | 2005-293816 | 10/2005 |

OTHER PUBLICATIONS

European search report in connection with corresponding European patent application No. EP 07 10 2794, May 14, 2007.

RECORDING METHOD FOR DYE-BASED RECORDABLE DVD MEDIUM AND RECORDING APPARATUS

BACKGROUND OF THE INVENTION

1. Field of the Invention

The present invention relates to a recording method for dye-based recordable DVD medium in which information can be recoded and additionally recorded by irradiating a dye-based recordable DVD medium with a light beam to induce optical changes such as transmittance and reflectance to the recording layer thereof, and also relates to a recording apparatus.

2. Description of the Related Art

Presently, recordable digital versatile discs (DVD-R) are developed as next-generation large capacity optical discs. As essential technologies to enhance recording capacity of optical discs, it is necessary to develop recording materials to micronize recording pits, to employ image compression formatting technologies as typified by MPEG2, and to develop technologies for shortening the wavelength of semiconductor lasers for reading recording pits.

Conventionally, as for semiconductor lasers of the red wavelength region, only AlGaInP laser diodes each having a wavelength of 670 nm such as for barcode readers or instrumentation units have been commercialized. With high-densification of optical discs, red lasers are increasingly used in the optical storage market. DVD drives are standardized using laser diodes with two wavelengths of 635 nm and 650 nm for their light sources. In the meantime, DVD-ROM (Read Only Memory Digital Versatile Disc) drives are commercialized with a wavelength of about 650 nm.

Typically, in a dye-based recordable DVD medium where pits (marks) are formed by use of heat mode, the pulse width and the recording power of a recording pulse train are optimized by emission of a laser during recording at a specific recording speed, thus there exist a problem that the condition of marks and spaces to be formed is changed at different recording linear velocities. In other words, dye-based recordable DVD media suffer from problems that the jitter values tend to be higher, because thermal capacity of leading heating pulses required to form marks turns into insufficient, and the heating temperatures are varied relative to the optimal decomposing temperature to attain, resulting in variations in average mark lengths, and uniform mark widths cannot be obtained due to varied duty ratio of optimum heating pulse, resulting in thin marks or thick marks formed depending on the mark lengths.

With respect to physical formats of DVD media, DVD-R media are standardized with a format of which the land portions of so-called land pre-pits are partially cut. According to the format, there are problems that when a land pre-pit signal (LPPb) is less than 0.16, pre-pit information such as pre-pit address cannot be properly reproduced; in contrast, when a land pre-pit signal (LPPb) is more than 0.32, the land-pit signal itself behaves noisily at data region, thus resulting in frequent occurrences of data errors. Accordingly, there is a disadvantage that the land cut width needs to be finely adjusted to each recording material by the use of a stamper, and the land cut width needs to be adjusted so as to control the land pre-pit signal within the range of 0.16 to 0.32.

In order to solve the above-noted problems associated with conventional technologies, the present applicant has filed Japanese Patent Application Laid-Open (JP-A) Nos. 2004-303400, 2004-303401, 2005-100579, 2005-243202, 2005-243208, and 2005-293816 as technologies focusing attention on recording information on a dye-based recordable DVD medium with one pulse as well as with the waveform used when performing high-speed recording, however, all these applications differ in means for solving problems from the present invention.

Optical recording media each using a dye for the recording layer therein known in the art are too numerous to enumerate. Examples of such optical recording media include the one using a polymethine dye or using a polymethine dye and a light stabilizer as recording materials; the one having a layer containing a tetraazaporphyrin (porphyradine) dye or a cyanine dye and an azo metal chelate dye (salt forming dye) and a reflective layer as the recording layer; the one using a formazan (metal chelate) dye and other dyes as recording materials; and the one using dipyrromethene (metal chelate) dye and other dyes as recording materials. In addition, a number of optical recording media which perform multi pulse recording using a dye as a recording material are known in the art, however, as far as the present inventors know, literature focusing attention on recording information on a dye-based recordable DVD medium with one pulse as well as with the waveform used when performing high-speed recording like the present invention has not been found so far.

SUMMARY OF THE INVENTION

The present invention aims to provide a recording method and a recording apparatus that allow for obtaining a favorable recording waveform when recording information on a dye-based recording DVD medium at high speed.

The present invention can solve the problems set forth above.

The recording method for dye-based recordable DVD medium of the present invention includes recording shortest marks on a recording layer primarily containing an organic dye, which is formed on a substrate having a guide groove with a wobble formed on a surface thereof, by the use of a simple rectangular wave pulse; recording marks each having the second shortest or still longer mark length by the use of one pulse of which two sites of the front and rear edges are highly energized for a given length of time; and controlling the optical energy for irradiating the rear edge or backwards of the one pulse with a cooling pulse so as to be 0.1 mW or less for a given length of time, wherein when the recording power of the front and rear edges of the pulse used for the marks each having the second shortest or still longer mark length is represented by $P_1$ and the recording power of intermediate pulse between the pulse front edge and the pulse rear edge is represented by $P_2$, marks are recorded while controlling the recording power $P_2$ according to a specific control strategy and controlling the recording power $P_1$ such that the value of $P_1/P_2$ is set to be a greater value provided that the recording power $P_1$ is a low power, and the value of $P_1/P_2$ is set to be a smaller value provided that the recording power $P_1$ is a high power.

The recording apparatus for dye-based recordable DVD medium of the present invention is equipped with a first recording unit configured to record shortest marks on a recording layer primarily containing an organic dye, which is formed on a substrate having a guide groove with a wobble formed on a surface thereof, by the use of a simple rectangular wave pulse; a second recording unit configured to record marks each having the second shortest or still longer mark length by the use of one pulse of which two sites of the front and rear edges are highly energized for a given length of time; a cooling pulse irradiation optical energy controlling unit configured to control the optical energy for irradiating the rear edge or backwards of the one pulse with a cooling pulse so as to be 0.1 mW or less for a given length of time; a laser beam irradiation unit configured to irradiate a pulse used for recording marks with a laser beam; a pulse outputting unit configured to set recording powers of $P_1$ and $P_2$ and output a pulse to the laser beam irradiation unit based on the set recording powers of $P_1$ and $P_2$ when the recording power of the front and rear edges of the pulse used for the marks each having the second shortest or still longer mark length is represented by $P_1$ and the recording power of intermediate pulse between the pulse front edge and the pulse rear edge is represented by $P_2$; and a controlling unit configured to control the pulse outputting unit such that the recording power $P_2$ is set according to a specific control strategy, and the recording power $P_1$ is set so as to set the value of $P_1/P_2$ to be a greater value provided that the recording power $P_1$ is a low power and set the value of $P_1/P_2$ to be a smaller value provided that the recording power $P_1$ is a high power.

The dye-based recordable DVD medium of the present invention has a substrate having a guide groove with a wobble formed on a surface thereof, and a recording layer primarily containing an organic dye, being formed on the substrate, wherein the dye-based recordable DVD medium is preformatted with information to carry out a recording method which includes recording shortest marks on a recording layer primarily containing an organic dye, which is formed on a substrate having a guide groove with a wobble formed on a surface thereof, by the use of a simple rectangular wave pulse; recording marks each having the second shortest or still longer mark length by the use of one pulse of which two sites of the front and rear edges are highly energized for a given length of time; controlling the optical energy for irradiating the rear edge or backwards of the one pulse with a cooling pulse so as to be 0.1 mW or less for a given length of time; and when the recording power of the front and rear edges of the pulse used for the marks each having the second shortest or still longer mark length is represented by $P_1$ and the recording power of intermediate pulse between the pulse front edge and the pulse rear edge is represented by $P_2$, marks are recorded while controlling the recording power $P_2$ according to a specific control strategy and controlling the recording power $P_1$ such that the value of $P_1/P_2$ is set to be a greater value provided that the recording power $P_1$ is a low power, and the value of $P_1/P_2$ is set to be a smaller value provided that the recording power $P_1$ is a high power.

According to the present invention, it is possible to efficiently widen a recording power margin (an allowable recording power range) by which recording properties such as jitter rate and error rate can be lowered, at any recording linear velocities. The recording method of the present invention can be easily applied to dye-based recordable DVD media. The recording method for dye-based recordable DVD medium and the recording apparatus of the present invention also allow for recording information on dye-based recordable DVD media each of which has a substantially same format as those of CD-R recording media or CD-RW recording media that are presently mass-produced.

DESCRIPTION OF THE PREFERRED EMBODIMENTS

Hereinafter, the present invention will be described in detail.

The present invention is characterized in that optimum recording powers of basic recording pulses are specifically defined.

Figure 4:
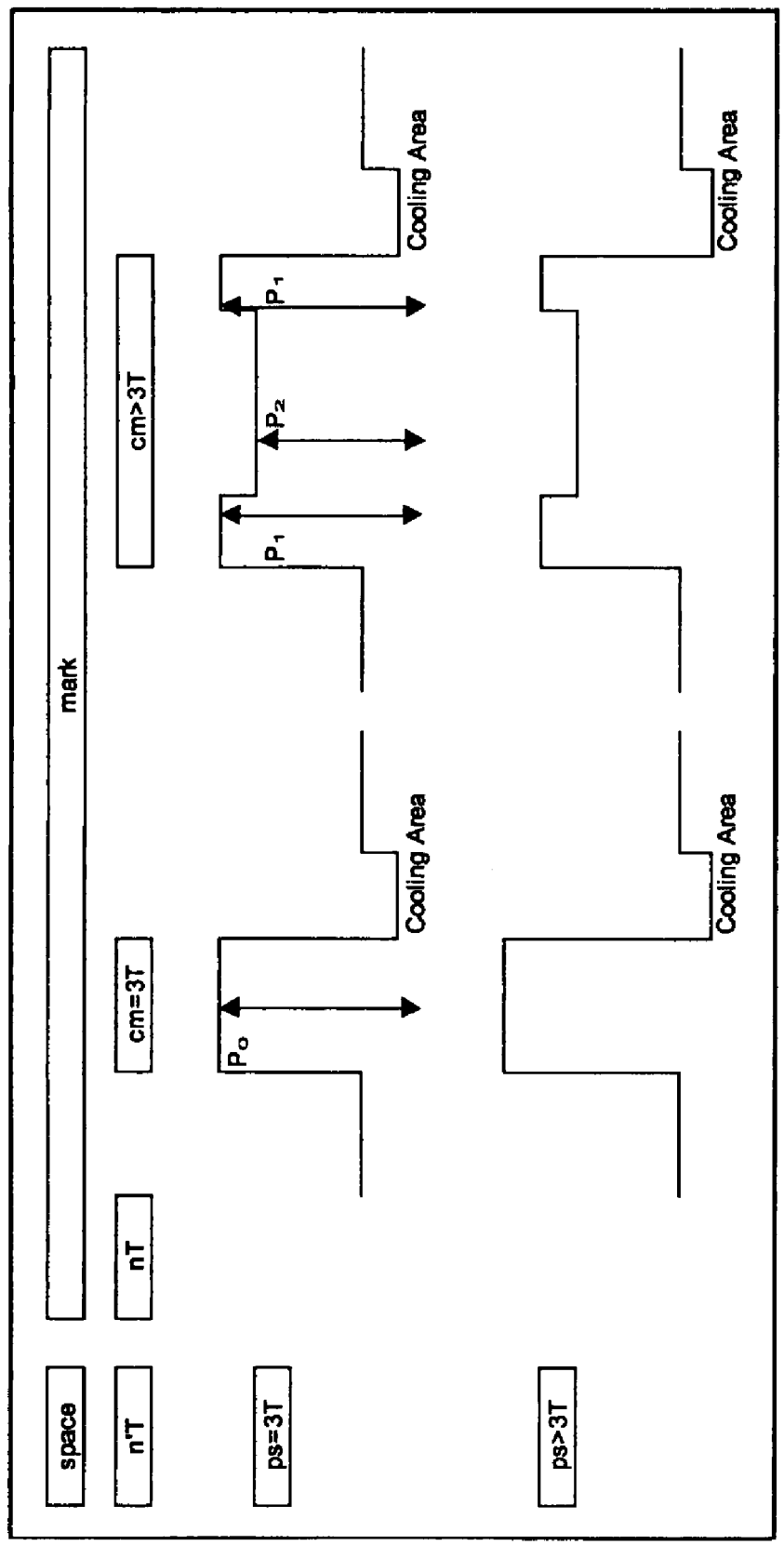
FIG. 4 is a view showing an example of a waveform for controlling the recording power used in the recording method for dye-based recordable DVD medium of the present invention.

FIG. 4 shows one example of a waveform for controlling recording power in which the front and rear edges of the pulse used for marks each having the second shortest or still longer mark length are highly energized. In FIG. 4, "T" represents a basic clock cycle; "n" and "n'" are respectively a positive number of 3 or more; "ps" represents the space length of a space just before a mark; "cm" represents a recording mark length; "$P_0$" represents the recording power of marks each having the shortest length; "$P_1$" represents the recording power with an additional power added thereto for marks each having the second shortest or still longer mark length; and "$P_2$" represents the recording power with no additional power added thereto for marks each having the second shortest and still longer mark length.

To reduce the number of recording parameters, typically, the recording power $P_0$ used for marks each having the shortest mark length is set so as to be the same as the recording power $P_1$ of which two sites of the front and rear edges of a pulse used for marks each having the second shortest or still longer mark length. When the recording power used for the pulse for the marks each having the second shortest or still longer mark length is set to $P_2$, the value of $P_1/P_2$ can be in the range of 1.10 to 2.00, however, the value of $P_1/P_2$ is preferably in the range of 1.20 to 1.70. With respect to marks each having the second shortest or still longer mark length, the period length required to highly energize the front and rear edges of pulses for the marks by adding an additional power thereto is particularly preferably in the range of 0.5 times to 2 times the basic clock cycle T i.e. in the range of 0.5T to 2T. The marks each having the second shortest or still longer mark length can also be recorded with a period length in the range of 0.2T to 3.0T.

In conventional technologies, when a recording strategy as shown in FIG. 4 is employed, the ratio of $P_1/P_2$ was set to a constant regardless of the value of $P_1$ (the value of $P_1$ corresponds to "a"=0 in the following Expression (1).

$$P_1' = b \times P_2 \times - a \times P_2^2 \qquad \text{Expression (1)}$$

In Expression (1), "a" and "b" are respectively a positive number.

However, findings in studies provided by present inventors revealed that with such recording power setting, sufficient recording properties cannot be obtained in high-speed recording. The studies also revealed that the optimum value of $P_1/P_2$ varies depending on the value of $P_1$. Specifically, it was found that recording properties can be enhanced (the jitter value can be lowered) by setting the value of $P_1/P_2$ to be greater when $P_1$ is a low power and by setting the value of $P_1/P_2$ to be smaller when $P_1$ is a high power. However, when there are a number of parameters used to set the value of $P_1/P_2$, it becomes a burden on the recording drive to control the parameters. Then, further studies provided based on the findings revealed that a recording power margin can be widened relative to a recording power when the recording power is controlled so as to satisfy the Expression (1). In the present invention, a recording power margin can be widened in comparison with the conventional technologies by setting optimum values of "a" and "b" in the Expression (1) to a positive number and a constant value which is independent on $P_2$ and by setting the values of "a" and "b" in accordance with the type of medium. The value $P_1$ varies depending on the type of recording medium, and the type of recording apparatus. Generally, the type of recording apparatus greatly influences upon setting of the optimum recording power.

The value "a" is typically set to 0.10 or less, and preferably set to around 0.01 to 0.04; the value "b" is typically set to 1.1 to 2.1, and preferably set to around 1.2 to 1.8, however, it is difficult to limit the values of "a" and "b" with specific numeric values because they are variable parameters depending on the type of medium.

In actual implementation of the recording method for dye-based recordable DVD medium of the present invention, the set value of recording power should only be changed, and thus the recording method can be easily applied to various recording apparatuses.

It should be noted that a predetermined recording method of the present invention indicates, for example, the methods which will be hereinafter described as (iv), (v), and (vi).

In the present invention, when recording marks, high-quality recording can be achieved at high-linear velocities by irradiating the rear edges or backwards of respective pulses used for all the marks with a cooling pulse and setting the optical energy of laser irradiation to 0.1 mW or less for a given length of time.

The optimum recording power (Pop) when recording information by the recording method of the present invention can be set according to the following methods (i) to (iii):

(i) Use of In-Medium Information

Information is previously recorded within a recording medium (CD: ATIP information; DVD+R: ADIP information; and DVD-R: Lpp information), and a recording apparatus can read the information. Since the information includes the optimum recording power for the medium, the information is used as the optimum recording power (Pop).

(ii) Set Optimum Recording Power (Pop) Based on In-Medium Information

Since in-medium information includes the information of the manufacturer and type of a recording medium, the optimum recording power (Pop) can be set based on the information (recording apparatuses respectively have ROM information in which the recording conditions suitable for the recording medium are recorded).

(iii) Use of Value Determined by Trial Recording

When trial recording is performed by varying the values of $P_1$ and $P_2$, the values of $P_1$ and $P_2$ are respectively set according to the Expression (1) set forth above, however, for the optimum recording power (Pop), the value defined in the above-noted method (i) or (ii) is used. The optimum recording power obtained as the result of the trial recording is used as the optimum recording power (Pop).

The recording power $P_2$ used when recording information according to the present invention may be controlled by the same method as used for typical recording apparatuses. In commercially available recording apparatuses, the recording power $P_2$ is typically controlled by the following methods (iv) to (vi):

(iv) Running OPC Recording Method

Information is recorded with varied recording powers in a trial recording area, signal properties during the recording and signal properties after the recording are stored in the recording medium, and then the recording power in a data storage area is controlled such that the signal properties after the recording can be optimized. The optimum signal properties after recording vary depending on the used recording apparatus, and error rate, jitter value, asymmetry value ($\beta$ value) and the like are used for the optimum signal properties.

(v) Step Recording Method

Information is recorded within a certain region in a data storage area in a trial recording area at a predetermined recording power and then the recording is stopped, the recording properties within the certain region are read, the recording power is controlled again, and information in another certain region is further recorded. A series of the above-noted operations is repeatedly continued, and then recording of the information in the data storage area is completed.

(vi) Recording Method Without Using Running OPC

Information is recorded in a trial recording area at a predetermined recording power. However, depending on the type of recording apparatus, trial recording should be performed in both the inner circumferential area and outer circumferential area of the disc, and information within data storage areas should be recorded from the inner circumference toward the outer circumference while compensating the recording power $P_2$ by utilizing the obtained two recording powers.

The recording power $P_1$ used when recording information according to the recording method of the present invention can be obtained by assigning the value $P_2$ determined as described above to the Expression (1).

The values of "a" and "b" used when recording information according to the recording method of the present invention are, as just as in the case of the optimum recording power (Pop), set by using values determined by any one of the methods of (i) Use of In-Medium Information, (ii) Set optimum recording power (Pop) based on in-medium information, and (iii) Use of value determined by trial recording.

Then the value $P_1$ is set based on the value $P_1'$. In other words, the value $P_1'$ may be directly used as the value $P_1$ ($P_1=P_1'$), or the value $P_1'$ with a given value added thereto or decreased therefrom according to the recording conditions and the like may be used as the value $P_1$.

In the present invention, since control information related to the values of "a" and "b" in the Expression (1) has been stored in a dye-based recordable DVD medium which is intended to be recorded, and thus, when recording information, the control information can be retrieved from the dye-based recordable DVD medium to set the values of "a" and "b" with ease.

For the values of "a" and "b", as just as in the case of the above-noted optimum recording power (Pop), values determined by any one of (i) Use of In-Medium Information, (ii)

Set optimum recording power (Pop) based on in-medium information, and (iii) Use of value determined by trial recording can be used.

In other words, control information may be values of "a" and "b" or may be information indicating the type of medium related to values of "a" and "b" such as name of manufacturer, the type of medium. In the latter case, information related to the information indicating values of "a" and "b" and the type of medium is stored in a storage device, and then the values of "a" and "b" are to be retrieved from the retrieved information indicating the type of the medium. Then, the thus retrieved the values of "a" and "b" may be optimized by performing trial recording.

In the recording method of the present invention, preferable laser irradiation prerequisites for cooling pulses provided at rear edges or backwards of a pulse are defined. In the present invention, the time required to irradiate the rear edge or backwards of the pulse with cooling pulses is preferably controlled to 1/6 to 6/6 as long as the shortest space length. Recording quality can be further enhanced within the range of laser irradiation time.

By selecting a pulse waveform as described above, it is possible to excellently record information with low-jitter property, particularly in recording at high-linear velocities.

Further, in consideration of influence of thermal interference, information can be recorded with further lower jitter values by distinguishing the pulse width and the leading heating pulse width of a recording pulse used for forming a mark of which the space length just before the mark is the shortest depending on whether the mark length of the mark of which the space length just before the mark is the shortest or not and setting the pulse width of a mark having the shortest mark length to be longer than the leading heating pulse width of each mark whose mark length is not the shortest (as an example, see the cases where the space length just before a mark is 3 T and a recording mark length is 3 T, or 4 T to 14 T in Table 1, which will be hereinafter described).

Furthermore, information can be recorded with still further lower jitter values by distinguishing the pulse width of a recording pulse used for a mark having the shortest mark length depending on whether the space length just before the mark having the shortest mark length is the shortest or not and setting the pulse width of the mark of which the space length just before the mark is the shortest to be shorter than the pulse width of each mark of which the space length just before the each mark is not the shortest (as an example, see the cases where a recording mark length is 3 T and the space length just before the mark is 3 T, or 4 T to 14 T in Table 1, which will be hereinafter described).

The compensation rate (period length) required to set the leading heating pulse width to be shorter is particularly preferably in the range of 0.02 T to 0.10 T. When the space length just before a mark to be formed is the shortest and the pulse width or the leading pulse width of a pulse for forming a mark of which the space length just before the mark is the shortest is substantially equal to that of each mark of which the space length just before the each mark is not the shortest, the space length just before the mark is shortened due to thermal interference, resulting in a slightly higher jitter value. To solve the problem, only in such a case, it is effective to shorten the pulse width or the leasing heating pulse width of a pulse for forming a mark of which the space length just before the mark is the shortest. Further, when the pulse width of a pulse for forming a mark of which the space length just before the mark is the shortest is desired to be shortened, it goes without saying that it is effective to increase the compensation rate of a pulse or a leading heating pulse (front edge) for recording a mark of which the space length just before the mark is the shortest to thereby shorten the pulse width.

When the space length just before a mark to be formed is the shortest and the pulse width of a pulse for forming the mark is shorter than 0.10 T, it is unfavorable because the mark length itself is excessively shortened.

The compensation rate (period length) used when setting the pulse width of a mark having the shortest mark length to be longer than the leading heating pulse width of each mark whose mark length is not the shortest is preferably 0.05 T to 0.25 T. Since it is difficult to form a mark having the shortest mark length particularly when the recording linear velocity is high, the pulse width of the mark having the shortest mark length should be compensated within the above-noted range to thereby lengthen the pulse width.

Table 1 shows a specific example of compensation rate of a pulse width or a leading heating pulse width.

TABLE 1

| | | Mark length of a mark to be recorded | |
|---|---|---|---|
| | | 3T | 4T to 14T |
| Space length of the space just before a mark to be recorded | 3T | ±0.00T | −0.05T |
| | 4T to 14T | +0.05T | ±0.00T |

As essential items for a recording layer, optical properties will be hereinafter explained.

As for the optical properties of the recording layer, with respect to beams at long wavelengths near wavelengths of recording and reproducing, namely, at wavelengths of recording beams and reproducing beams±5 nm, it is preferred that a single recording layer have a refractive index "n" of $1.5 \leqq n \leqq 3.0$ and an extinction coefficient "k" of $0.02 \leqq k \leqq 0.2$. When the value "n" is less than 1.5, it is unfavorable because sufficient optical changes can be hardly obtained, and the recording modulation degree lowers. When the value "n" is more than 3.0, it is unfavorable because the dependency on wavelength is exceedingly high, and errors occur even at wavelengths for recording and reproducing. In addition, when the value "k" is less than 0.02, it is unfavorable because it results in a degraded recording sensitivity. When the value "k" is more than 0.2, it is also unfavorable because a reflectance of 50% or more is hardly obtainable.

DVD-ROM is typically standardized at near the wavelength of 650 nm; the wavelength of the pulse beam for recording media is standardized at 650 to 660 nm for popular applications besides 635 nm for authoring exclusive media. However, these wavelengths are center wavelengths, namely each of the wavelengths may be larger or smaller depending on the fluctuations at producing the semiconductor laser diode (LD). Further, LDs typically tend to inherently increase the wavelength when temperature rises. The recording layer in the present invention is applicable within the wavelength region of 600 nm to 720 nm which includes the range described above.

Next, wobble properties of the wobbling guide groove to be formed on the substrate will be described. The basic clock cycle T for determining the wobble frequency is about 0.133 μm or about 38 nsec in the case of 4.7 GB DVD media.

Typically, for the frequency band of wobble, a basic clock cycle corresponding to 150 T to 400 T is used. The frequency band may not be suitable for high density recording when data is added to be recorded by frequency modulation or phase modulation since significant spaces inevitably exist between the previous data and the data to be additionally recorded. In order to remove this disadvantage, LPP is provided with recordable DVD-R, and the sites to be recorded with data are controlled by the LPP signals.

However, in the controlling by the LPP, there are disadvantages that signals may not be read properly when the signal amplitude from LPP is excessively small, on the contrary, when the LPP signal is excessively large, data errors frequently occur due to leakage of LPP signals into recording data. In order to avoid the disadvantages, the optimum signal amplitude is limited to $0.16 \leqq LPPb \leqq 0.32$ in LPP and preferably $0.18 \leqq LPPb \leqq 0.26$ in LPP. Accordingly, the cut width of lands should be controlled precisely at preparing the stamper.

By the way, the employment of a high-frequency wobble can bring about that the LPP is unnecessary no longer, and synchronization is performed by modulating the wobble; therefore, frequent data errors may be avoided as seen in LPP method.

The preferred frequency of the high-frequency wobble is 4T to 96T. When the wobble frequency is less than 4T, the detection is likely to be difficult due to excessively low frequency, and the reliability as to rotation control and address detection may be insufficient, and when the wobble frequency is more than 96T, the space intervals between additionally recorded data is excessively wide, resulting in a reduced capacity or an insufficient data processing speed.

As for the wobble amplitude of the recordable DVD media in the present invention, when the ratio of wobble amplitude Wo after passing through appropriate filters such as high filter at 4 MHz and low filter at 30 kHz to push-pull amplitude PP after passing through a filter at 30 kHz, i.e. Wo/PP, satisfies the relation $0.1 \leqq Wo/PP \leqq 0.4$, the synchronization is relatively easy, and is preferably $0.15 \leqq Wo/PP \leqq 0.3$.

When Wo/PP is less than 0.1, the signal intensity is insufficient to synchronize, and when Wo/PP is more than 0.4, the data errors tend to increase. In this type, the DVD media having larger LPP do not cause significantly data errors compared to LPP type, i.e. data errors tend to increase gradually along with the increase of wobble amplitude.

In the preparation of the stamper, the LPP type requires precise cut width control in order to adjust the LPP cut width into 0.16 to 0.32, whereas the wobble type in the present invention requires no more than the control of high-frequency source and swing level of a wobble (the swing level of the wobble can be arbitrarily controlled to gain excellent reproducibility in the circuit to control the swing level), therefore, the yields of stampers and DVD media can be increased remarkably.

As for the groove shape of the substrate on which the format is formed, the groove depth is preferably 1,000 angstroms to 2,500 angstroms, and more preferably 1,500 angstroms to 2,000 angstroms in the case that recording layers are formed using an organic dye by solvent coating processes. When the groove depth is less than 1,000 angstroms, the tracking may not be controlled appropriately due to insufficient push-pull signals, and then the grove depth is more than 2,500 angstroms, it is unfavorable because the transferring ability may be deteriorated at molding substrates.

Preferably, as for the dye groove depth d1 when a dye recording layer is provided, the following relation is preferable:

$$1,200 \leqq d1 \times m \leqq 160,000$$

where mT: wobble frequency (m: natural number)

When (d1×m) is less than 1,200, the differential signals are insufficient, the tracking may not be performed appropriately at recording and reproducing, and when (d1×m) is more than 160,000, oscillation may be induced that may adversely effect on the tracking. By the way, the groove depth of substrates are typically limited by the transferring limit due to the substrate molding described above, thus the groove depth is limited to 160,000 or less in practice.

The pitch of tracks is typically required to be 0.64 μm to 0.8 μm in order to assure the recording density of 4 GB to 5 GB. The groove width depends on the recording material in general; usually the half-width is 0.18 μm to 0.40 μm in almost all organic materials.

Figure 1A:
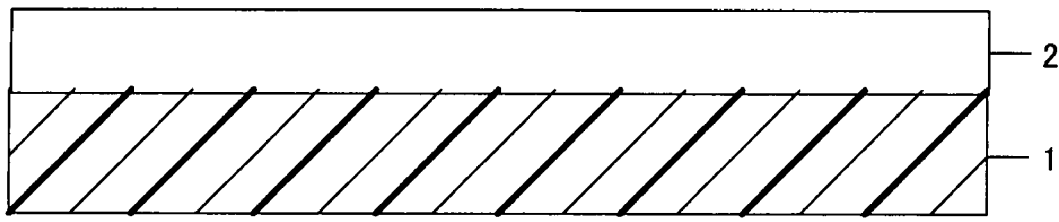
FIGS. 1A to 1D are respectively a view showing an example of laminar structure of a typical recordable optical recording medium.
Figure 1B:
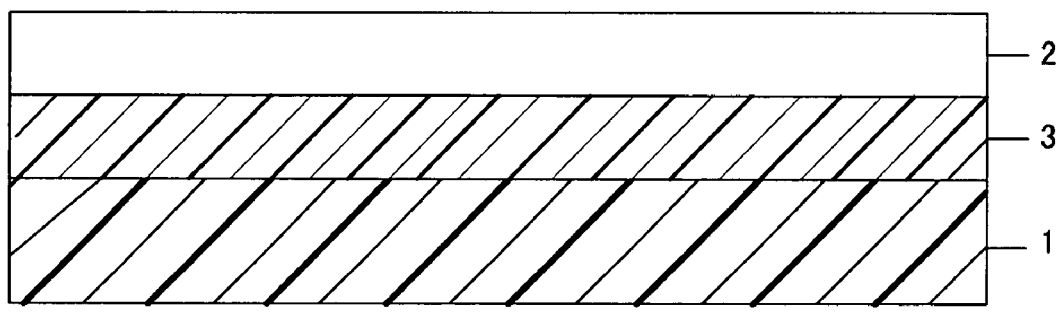
Figure 1C:
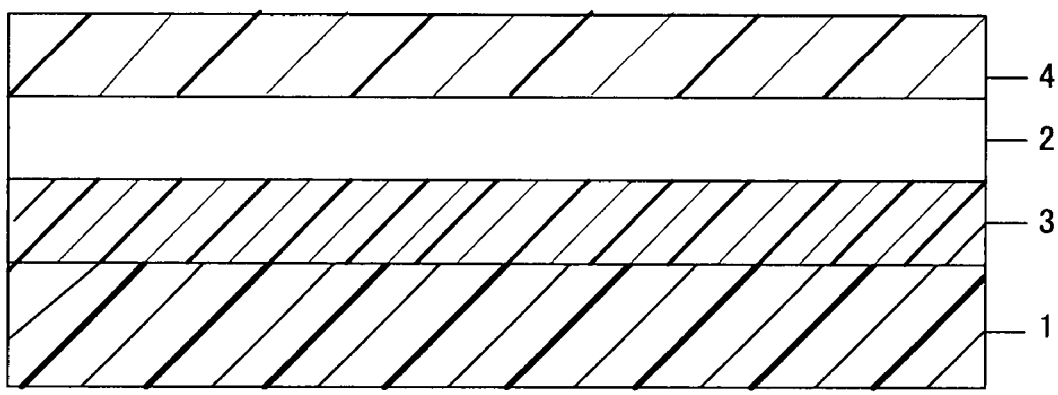
Figure 1D:
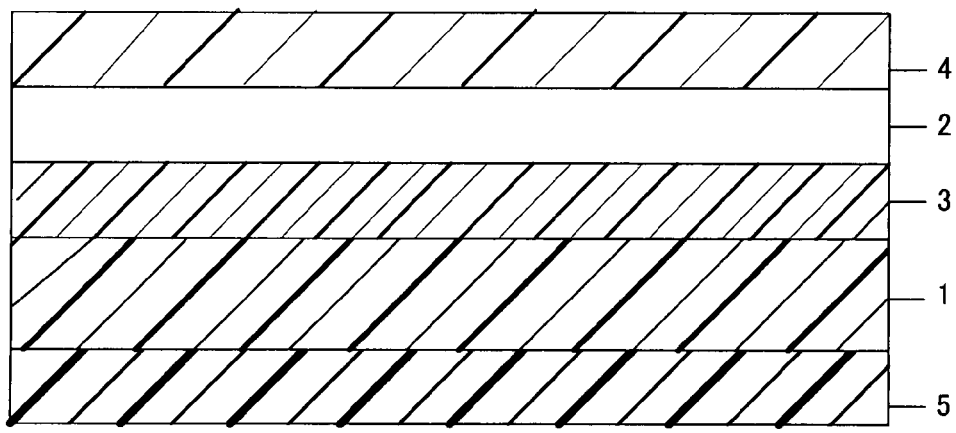
Figure 2A:
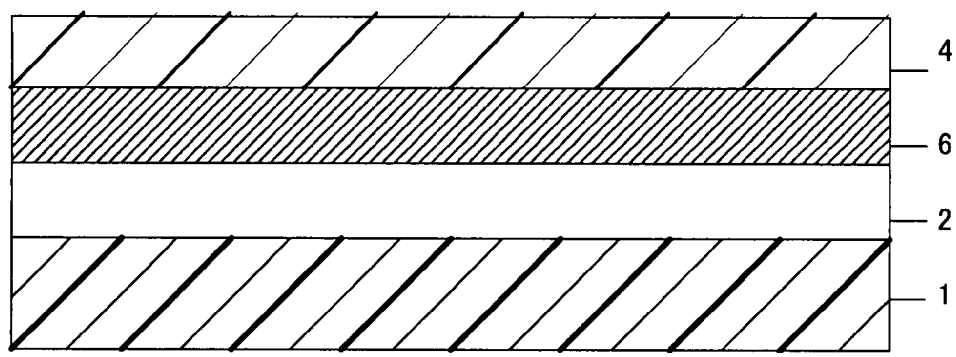
FIGS. 2A to 2C are respectively a view showing an example of laminar structure of a typical CD-R medium.
Figure 2B:
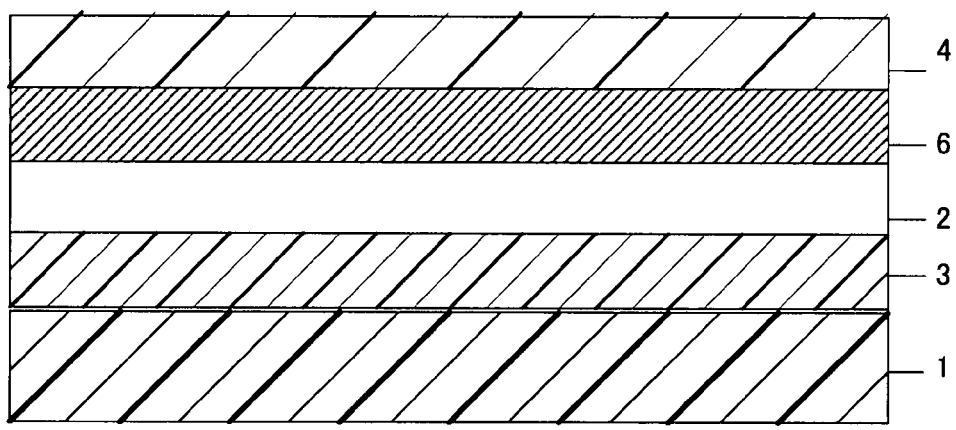
Figure 2C:
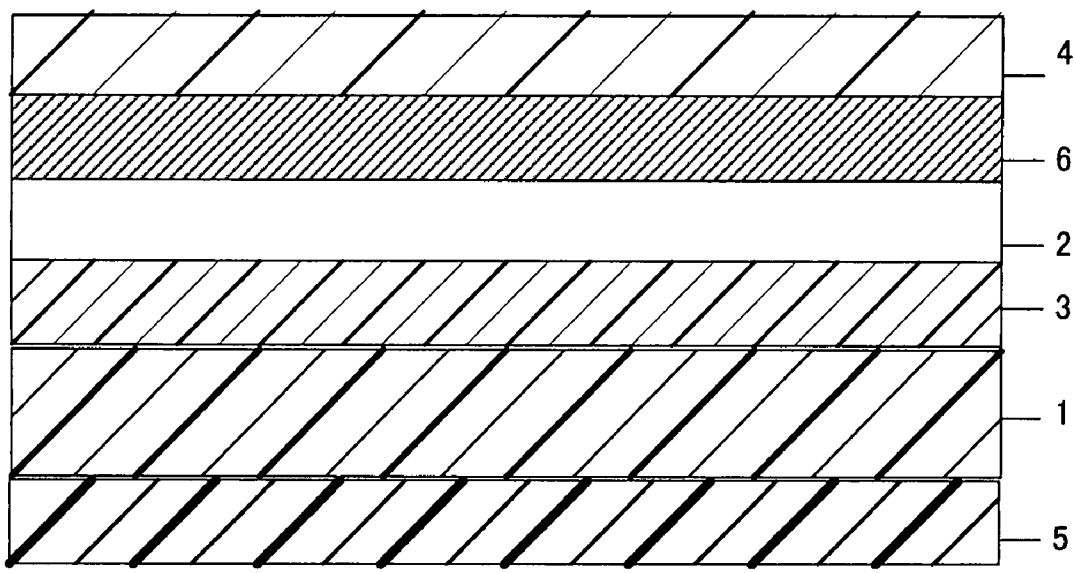
Figure 3A:
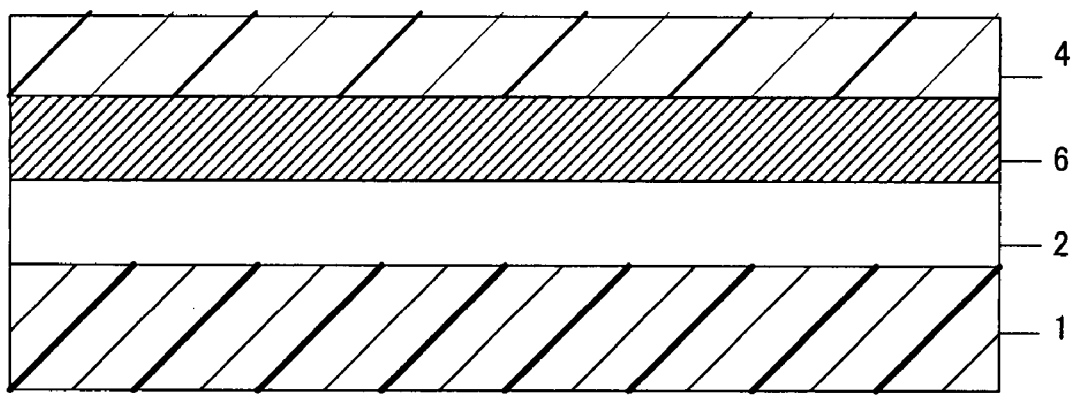
FIGS. 3A to 3C are respectively a view showing an example of laminar structure of a dye-based recordable DVD medium.
Figure 3B:
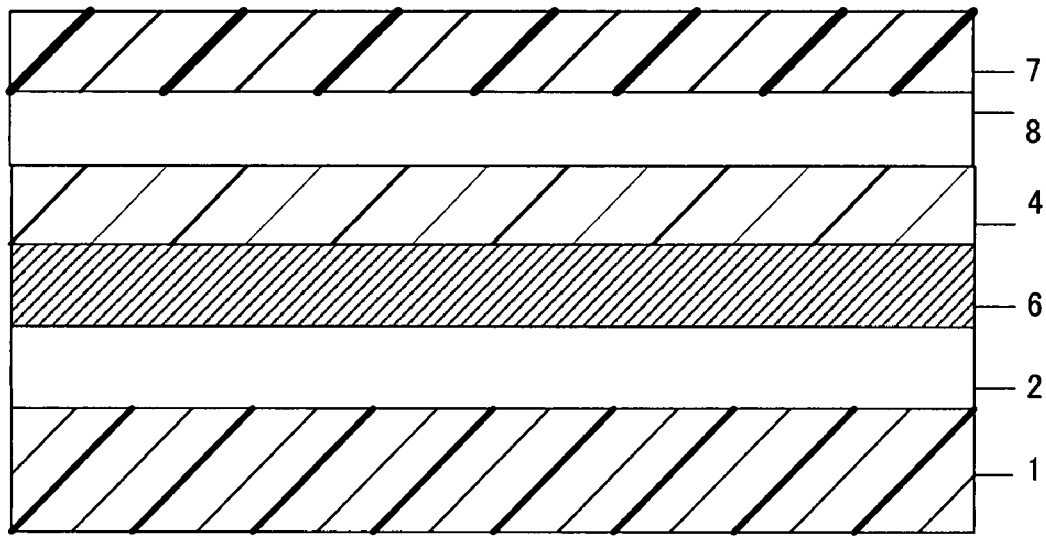
Figure 3C:
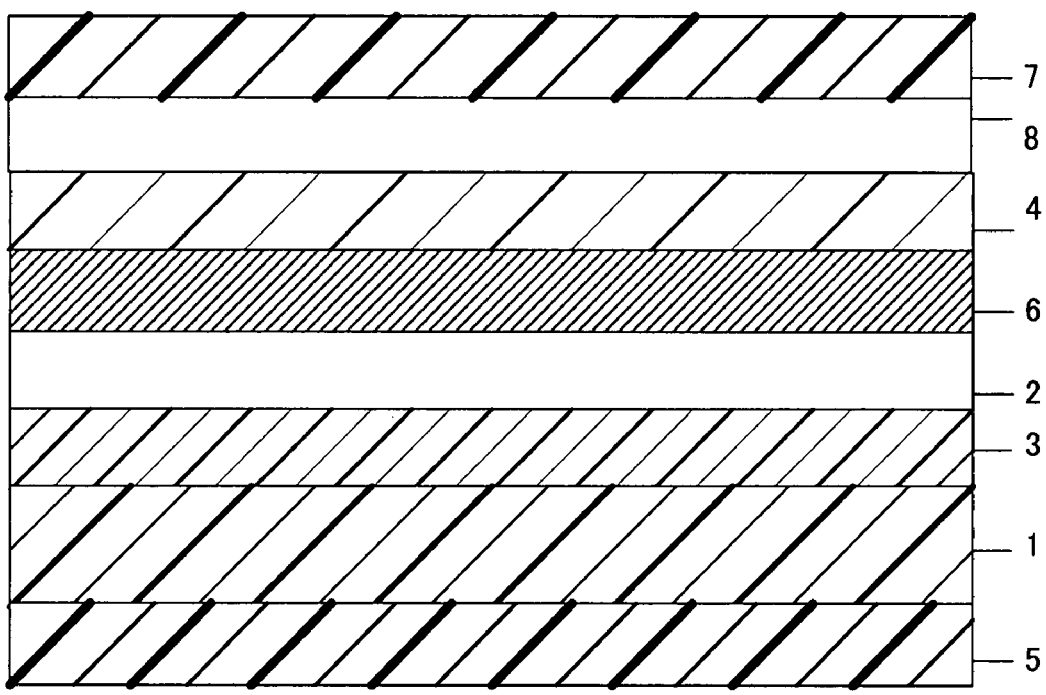

Next, the following describes the layer structure of the dye-based recordable DVD media intended for the present invention, and the essential properties and the constitutional materials thereof FIGS. 1A to 1D exemplarily show a layer structure of a conventional recordable optical disc, respectively; FIGS. 2A to 2C exemplarily show a layer structure of a conventional CD-R medium, respectively; and FIGS. 3A to 3C exemplarily show a layer structure of a recordable DVD medium, respectively. The dye-based recordable DVD medium of the present invention preferably has a basic layer structure in which a first substrate and a second substrate (or protective substrate) are bonded with an adhesive so as to sandwich a recording layer therebetween, as shown in FIGS. 3B and 3C.

In FIGS. 1A to 1D, 2A to 2C, and FIGS. 3A to 3C, a substrate is indicated by reference numeral 1; a recording layer is indicated by reference numeral 2; an undercoat layer is indicated by reference numeral 3; a protective layer is indicated by reference numeral 4; a hard-coat layer is indicated by reference numeral 5; a metal reflective layer is indicated by reference numeral 6; a protective substrate is indicated by reference numeral 7; and an adhesive layer is indicated by reference numeral 8.

The recording layer 2 may be a single organic dye layer or may be formed in a laminar structure of an organic dye layer and a reflective layer for increasing the reflectance. The undercoat layer 3 or the protective layer 4 may be formed between the recording layer 2 and the substrate 1, and in order to enhance properties of a recordable optical medium, each of the individual layers may be formed with two or more layers in a laminar structure. The most commonly used layer structure is composed of a first substrate, an organic dye layer, a reflective layer, a protective layer, an adhesive layer, and a second substrate (protective substrate).

<<Substrate>>

When recording and/or reproducing is performed from the substrate side, the substrate must be transparent to laser beams, however, when recording and/or reproducing is performed from the recording layer side, the substrate is not necessarily transparent to laser beams. Examples of materials available for the substrate include plastics such as polyester resins, acrylic resins, polyamide resins, polycarbonate resins, polyolefin resins, phenol resins, epoxy resins, and polyimide resins; glasses, ceramics, and metals. On the surface of the substrate, a guide groove or a guide pit for tracking, and a preformat such as address signals may be formed. As specific examples of the preformat, land prepit method is used for DVD-R/RW discs, and high-frequency wobble method is used for DVD+R/RW discs. In both of the methods, disc information and address information is input in discs, and a recording drive can perform recording based on the information.

<<Recording Layer>>

On the recording layer, somewhat optical changes are induced by irradiation of a laser beam, and information is recorded by means of the optical changes. A material containing an organic dye as the main component is used for the recording layer. Here, the term "the main component" means that an organic dye in a sufficient amount for recording and reproducing information is contained, and typically, only an organic dye or organic dyes are used except for a small amount of additives to be suitably added in accordance with the necessity.

Examples of the organic dyes include azo dyes, formazan dyes, dipyrromethene dyes, (poly)methyne dyes, naphtalocyanine dyes, phthalocyanine dyes, tetraazaporphyrin dyes, squarylium dyes, chloconium dyes, pyrylium dyes, naphthoquinone dyes, anthraquinone dyes (indanthrene dyes), xanthene dyes, triphenylmethane dyes, azulene dyes, tetrahydrocoline dyes, phenanthrene dyes, triphenothiazine dyes, and metal complexes thereof. Among these dyes, azo(metalchelate) dyes, formazan(metalchelate) dyes, squarylium(metalchelate) dyes, dipyrromethene(metalchelate) dyes, trimethynecyanine dyes, tetraazaporphyrin dyes, and metal complexes thereof are preferable.

With respect to the thermal decomposition property of these dyes, the initial decomposition temperature or kick-off temperature is preferably 100° C. to 360° C., and particularly preferably 100° C. to 3.50° C. When the kick-off temperature is more than 360° C., the pits may not formed successfully, thus the jitter value will be higher, and when the kick-off temperature is less than 100° C., the storage stability degrades.

The dyes described above may be added with other organic dyes, metals, and/or metal compounds in order to improve the optical properties, recording sensitivity and/or signal properties, or a dye-layer and a layer containing other organic dyes, metals, and/or metal compounds may be formed as a recording layer in a laminar structure.

Examples of such additional metals and metal compounds include In, Te, Bi, Se, Sb, Ge, Sn, Al, Be, $TeO_2$, SnO, As and Cd. Each of these metals and metal compounds may be dispersed and mixed for use.

Further, in the dye materials described above, for example, polymer materials such as ionomer resins, polyamide resins, vinyl resins, natural polymers, silicones, and liquid rubbers; silane coupling agents may be dispersed and mixed, or for the purpose of improving properties, stabilizers such as transition metal complexes, dispersing agents, flame-retardants, lubricants, antistatic agents, surfactants, and plasticizers may be used along with the dye materials.

The recording layer may be formed by conventional methods such as vapor deposition method, sputtering method, CVD method, and coating method. The coating method may be carried out by dissolving materials described above in an organic solvent to form a coating liquid, then the coating liquid is processed by conventional coating method such as spray coating, roller coating, dip coating, and spin coating. Examples of the organic solvent for use include alcohols such as methanol, ethanol, and isopropanol; ketones such as acetone, methyl ethyl ketone, and cyclohexanone; amides such as N,N-dimethylformamide and N,N-dimethylacetamide; sulfoxide such as dimethylsulfoxide; ethers such as tetrahydrofuran, dioxane, diethylether, and ethyleneglycol monomethylether; esters such as methyl acetate and ethyl acetate; halogenated hydrocarbons such as chloroform, methylene chloride, dichloroethane, carbon tetrachloride, and trichloroethane; aromatics such as benzene, xylene, monochlorobenzene, and dichlorobenzene; cellosolve such as methoxy ethanol, ethoxy ethanol; and hydrocarbons such as hexane, pentane, cyclohexane, and methyl cyclohexane.

The thickness of the recording layer is appropriately 100 angstroms to 10 µm, and preferably 200 angstroms to 2,000 angstroms.

<<Undercoat Layer>>

The undercoat layer is disposed for the purposes of (1) improving the adhesion, (2) serving as a barrier layer against water or gases, (3) improving the shelf life of the recording layer, (4) improving the reflectivity of the recording layer, (5) protecting the substrate from solvents, and/or (6) forming guide grooves, guide pits, pre-formats, and the like. To attain the above-noted purpose (1), various polymer compounds such as ionomer resins, polyamide resins, vinyl resins, natural resins, natural polymers, silicones, and liquid rubbers, and silane coupling agents may be employed. To attain the purposes (2) and (3), inorganic compounds such as SiO, MgF, $SiO_2$, TiO, ZnO, TiN, and SiN can be used in addition to the above-described polymer materials. Further, metals and semimetals such as Zn, Cu, Ni, Cr, Ge, Se, Au, Ag, and Al can be used. To attain the purpose (4), metals such as Al, Au and Ag, and organic thin films having a metal luster such as methine dye and xanthene dye may be used. To attain the purposes (5) and (6), an ultraviolet curable resin, a thermosetting resin, and a thermoplastic resin can be used.

The thickness of the undercoat layer may be properly selected depending on the application; preferably, the thickness is 0.01 µm to 30 µm, and more preferably 0.05 µm to 10 µm.

<<Reflective Layer>>

Examples of materials of the reflective layer include metals and semimetals exhibiting high reflectivity corrosion resistance such as Au, Ag, Cr, Ni, Al, Fe, and Sn. Among these metals, Au, Ag, and Al are particularly preferred in view of the reflectivity and the productivity. These metals and semimetals may be used alone or in combination of two or more as an alloy.

The reflective layer may be formed by deposition, sputtering or the like. The thickness of the reflective layer is typically 50 angstroms to 5,000 angstroms, and preferably 100 angstroms to 3,000 angstroms.

<<Protective Layer, Hard-coat Layer Formed on Substrate Surface>>

The protective layer and the hard coat layer on the substrate surface may be provided in order to (1) protect the recording layer or the reflection absorbing layer from scratches, dust, and contamination, (2) improve the shelf life of the recording layer or the reflection absorbing layer, and (3) improve the reflectivity. To satisfy these purposes, materials similar to those used for the undercoat layer may be used. In addition, organic materials of thermoplastic materials, thermosetting materials, and UV curable resins are available such as polymethacrylate resins, polycarbonate resins, epoxy resins, polystyrene resins, polyester resins, cellulose resins, aliphatic hydrocarbon resins, aromatic hydrocarbon resins, natural rubber, styrene-butadiene resins, chloroprene rubbers, waxes, alkyd resins, drying oils, and rosins. Among these, UV curable resins are preferable from the view point of the superiority of productivity.

The thickness of the protective layer or the hard coat layer is typically 0.01 µm to 30 µm, and preferably 0.05 µm to 10 µm.

The protective layer or the hard coat layer on the substrate surface may contain stabilizers, dispersing agents, flame-retardants, lubricants, antistatic agents, surfactants, and plasticizers as is the case with the recording layer.

<<Protective Substrate>>

The protective substrate is required to be transparent to laser beams when the laser beam is applied through the substrate, however, when the protective substrate is used for protective purpose, the transparency is not required. The materials for the protective substrate are utterly the same as those for the substrate; for example, plastics such as polyesters, acrylic resins, polyamides, polycarbonate resins, polyolefin resins, phenol resins, epoxy resins, and polyimides; glass, ceramics, metals, and the like may be used.

<<Adhesive Layer>>

The material of the adhesive layer may be suitably selected, provided that the two recording media can be bonded together, and the material of the adhesive layer is selected from UV curable adhesives and hot-melt adhesives in consideration of productivity.

Further, in order to carry out the recording method of the present invention, it is desirable that information relating to the recording method set forth above is preliminarily preformatted in a dye-based recordable DVD medium which is intended to be recorded. A specific example of the preformat is as described in the explanation of the substrate.

Hereinafter, the recording apparatus of the present invention will be described.

Optical discs are used as media for storing a large amount of information, typically, information is recorded on and reproduced from an optical disc by an optical disc drive or a recording and reproducing apparatus. Here, configuration of optical discs and optical disc drives will be outlined.

DVD-RAM•Wo, DVD-R, DVD+R, and DVD-RAM, DVD-RW, and DVD+RW discs are recordable DVD (Digital Versatile Discs). DVD-RAM•Wo, DVD-R, and DVD+R discs are DVD capable of recording only once, which are referred to as DVD Write Once. DVD-RAM, DVD-RW, and DVD+RW discs are DVD capable of recording more than once. As for Optical discs such as DVD+R and DVD+RW, information is recorded and reproduced by an optical disc drive as shown in FIG. 5.

Figure 5:
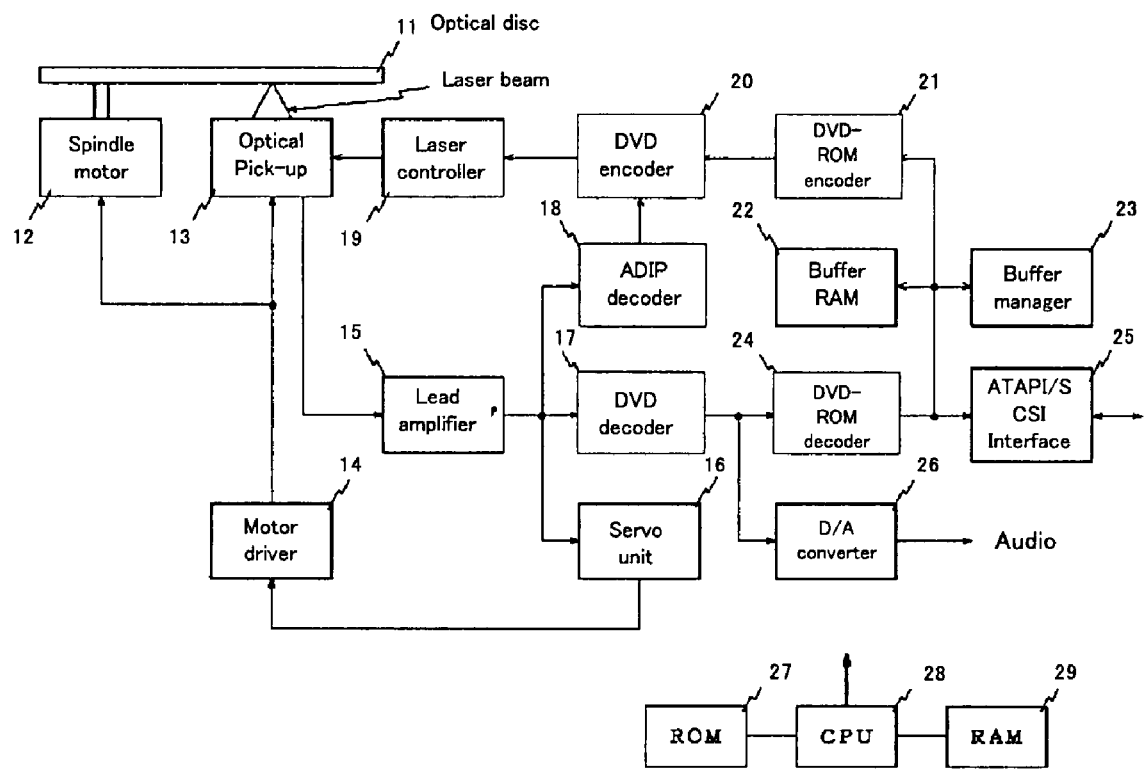
FIG. 5 is a block diagram showing one example of core parts of an optical disc drive.

FIG. 5 is a block diagram exemplarily showing core parts of an optical disc drive. The optical disc drive shown in FIG. 5 includes an optical disc 11, a spindle motor 12, an optical pickup 13, a motor driver 14, a read amplifier 15, a servo unit 16, a DVD decoder 17, an ADIP decoder 18, a laser controller 19, a DVD encoder 20, a DVD-ROM encoder 21, a buffer RAM 22, a buffer manager 23, a DVD-ROM decoder 24, an ATAPI/SCSI interface 25, a D/A converter 26, a ROM 27, a CPU 28, and a RAM 29. In FIG. 5, LB represents a laser beam, and Audio represents audio output signals.

In FIG. 5, the arrow marks indicate the main direction of data flow. In order to avoid a complicated expression in the figure, the CPU 28 that controls the respective blocks in FIG. 5 is expressed by removing the connections with the respective blocks using only wide lines. In the ROM 27, a control program written in codes that can be decoded by the CPU 28 is stored. When the power source of the optical disc drive is turned on, the program is loaded on a main memory (not shown), the CPU 28 controls the respective parts in accordance with the program and stores necessary data to control into the RAM 29 temporarily.

The structure and operations of the optical disc drive are as follows. The optical disc 11 is driven to rotate by the spindle motor 12. The spindle motor 12 is controlled by the motor driver 14 and the servo unit 16 so as to a regular linear velocity or a regular angular velocity can be kept. The linear velocity or the angular velocity may be changed step-wise.

The optical pickup 13 incorporates a semiconductor laser, optical system, focus actuator, track actuator, receiving optics, and position sensor (not shown respectively), and irradiates laser beam LB onto the optical disc 11. The optical pickup 13 can be moved in a sledge direction by a seek motor. These focus actuator, track actuator and seek motor are controlled by the motor driver 14 and the servo unit 16 based on the signals from the receiving optics and the position sensor so as to situate the spot of laser beam LB on the intended site of the optical disc 11.

In reading stage, reproducing signals obtained by the optical pickup 13 are amplified and binarized by the read amplifier 15, and input into the DVD decoder 17. The input and binarized data is demodulated by 8/16 at the DVD decoder 17. The recording data is bundled by every 8 bits and modulated to 8/16 modulation, and 8 bits are transformed into 16 bits in the modulation. In this case, the combined bits are assigned such that the prior numbers of "1" and "0" are equal when averaged, which is referred to as "suppression of DC component" wherein the fluctuation of slice level of DC cut regeneration signals is suppressed.

The demodulated data is processed with respect to deinterleave and error correction. Then the data is input into the DVD-ROM decoder 24, and further processed with respect to error correction so as to enhance the data reliability. The data subjected to two times of error correction is stored once at the buffer RAM 22 by means of the buffer manager 23, and transferred to a host computer (not shown) at a time through the ATAPI/SCSI interface 25 in a state that is collected as sector data. In the case of music data, the data output from the DVD decoder 17 is input to the D/A converter 26 and then is taken out as audio output signals Audio of analog data.

Further, at the stage of writing, the data sent from the host computer through the ATAPI/SCSI interface 25 is stored at the buffer RAM 22 by means of the buffer manager 23 once. Then, the writing operation starts; before the writing operation, the laser spot is required to be positioned at the writing initiating site. The site is determined from wobble signals which are previously recorded with slightly sinusoidal waves of tracks on the optical disc 11 in the case of DVD+RW/+R.

Further, the site is determined by land pre-pits in the case of DVD-RW/-R, by pre-pits in the case of DVD-RW/RAM•WO in place of wobble signals.

The wobble signals in DVD RW/+R discs contain address information of so-called ADIP (ADress In Pre-groove), and the address information is retrieved by the ADIP decoder 18. The synchronous signals generated by the ADIP decoder 18 are input to the DVD encoder 20, which enables to write data at correct sites on the optical disc 11. The data stored in the buffer RAM 22 is subjected to addition of error correction code and/or an interleaving operation by the DVD-ROM encoder 21 and/or the DVD encoder 20, then is recorded into the optical disc 11 by the use of a recording waveform according to the present invention through the laser controller 19 and the optical pickup 13.

Another aspect of the recording apparatus of the present invention is equipped with a first recording unit configured to record shortest marks on a recording layer primarily containing an organic dye, which is formed on a substrate having a guide groove with a wobble formed on a surface thereof, by the use of a simple rectangular wave pulse; a second recording unit configured to record marks each having the second shortest or still longer mark length by the use of one pulse of which two sites of the front and rear edges are highly energized for a given length of time; a cooling pulse irradiation optical energy controlling unit configured to control the optical energy for irradiating the rear edge or backwards of the one pulse with a cooling pulse so as to be 0.1 mW or less for a given length of time; a laser beam irradiation unit configured to irradiate a pulse used for recording marks with a laser beam; a pulse outputting unit configured to set recording powers of $P_1$ and $P_2$ and output a pulse to the laser beam irradiation unit based on the set recording powers of $P_1$ and $P_2$ when the recording power of the front and rear edges of the pulse used for the marks each having the second shortest or still longer mark length is represented by $P_1$ and the recording power of intermediate pulse between the pulse front edge and the pulse rear edge is represented by $P_2$; and a storing unit configured to store the following Expression (1), wherein the controlling unit is configured to assign the value of the controlled recording power $P_2$ to the following Expression (1) which has been read from the storing unit to thereby calculate a recording power $P_1'$; and the pulse outputting unit is configured to set the recording power $P_1$ based on the calculated recording power $P_1'$, $$P_1' = b \times P_2 \times -a \times P_2^2 \qquad \text{Expression (1)}$$

In the Expression (1), "a" and "b" are respectively a positive number.

With this configuration, high-quality recording can be achieved at high-linear velocities.

When information is recorded, the laser controller 19 receives signals from the DVD encoder 20 shown in FIG. 5, the recording powers $P_1$ and $P_2$ controlled for information of respective signals are set in the laser controller 19, and then a recording waveform according to the present invention is output through the optical pickup 13.

In other words, in the scope of the claims of the present invention, "the laser beam irradiation unit" is primarily composed of the optical pickup 13; "the pulse outputting unit" is primarily composed of the laser controller 19; "the storing unit" is composed of the ROM 27; and "the controlling unit" is primarily composed of the DVD encoder 20 and the CPU 28.

The recording apparatus for dye-based recordable DVD medium of the present invention is further equipped with a retrieving unit configured to retrieve control information related to the values "a" and "b" in the Expression (1) from a dye-based recordable DVD medium in which the control information has been stored, and the controlling unit is configured to control and set the values of "a" and "b" in the Expression (1) based on the retrieved control information. Here, "the retrieving unit" is configured to retrieve the control information just as in the case of reading of reproducing signals as described above.

In addition, the controlling unit is configured to control the pulse outputting unit such that the time required to irradiate the rear edges or backwards of respective pulses with the cooling pulse can be 1/6 to 6/6 as long as the shortest space length. With this configuration, recording quality can be further enhanced.

Furthermore, the controlling unit is configured to control a pulse outputting unit such that the pulse width of a mark having the shortest mark length is set to be longer than the leading heating pulse width of each mark whose mark length is not the shortest by distinguishing the pulse width and the leading heating pulse width of a recording pulse for forming a mark of which the space length just before the mark is the shortest depending on whether the mark length of the mark of which the space length just before the mark is the shortest is the shortest or not; and the pulse width of the mark of which the space length just before the mark is the shortest is set to be shorter than the pulse width of each mark of which the space length just before the each mark is not the shortest by distinguishing the pulse width of a recording pulse for forming the mark having the shortest mark length depending on whether the space length just before the mark having the shortest mark length is the shortest is the shortest or not. With this configuration, the recording apparatus of the present invention allows for achieving high-quality recording, i.e., low-jitter property.

In the present invention, for a method of retrieving address information, a method of retrieving address information from a land prepit or a prepit may be employed.

Figure 6:
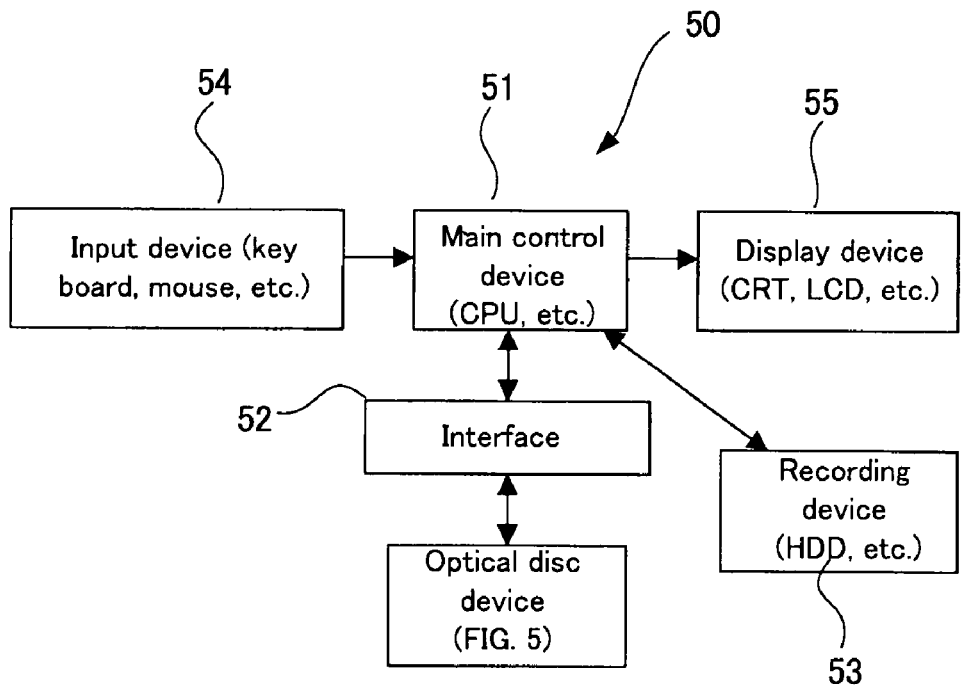
FIG. 6 is a view schematically showing an information processing device using the optical disc drive shown in FIG. 5.

FIG. 6 is a view schematically showing an information processing unit utilizing the optical disc drive shown in FIG. 5. Information processing unit 50 is equipped with main control device 51, interface 52, recording device 53, input device 54, and display device 55, and the like.

The main control device 51 is structured from a CPU (central processing unit, micro computer), main memory, and the like (respectively not shown), and controls the entire host computer thereby.

Interface 52 is a communication interface interactive with optical disc drive, and is based on standard interfaces such as ATAPI and CSI. The interface 52 is connected to interface 25 of the optical disc drive described above. The connection between the respective interfaces may be not only cable connection by means of communication line or cable such as SCSI cable but also wireless connection utilizing infrared ray for example.

Information recording device 53 (HDD, hard disc) is equipped with a program written by cords readable by the microcomputer of the main control device 51. When the driving power source of the information processing unit is turned on, the program is loaded on the main memory of the main control device 51.

The display device 55 is equipped with a displaying portion (not shown) such as a CRT, liquid crystal display (LCD), and plasma display panel (PDP), and displays various information from the control device 51. The input device 54 is equipped with at least one input medium (not shown) such as a keyboard, mouse, and pointing device, and informs the main control device 51 of a variety of information input by users. Information from the input media may be input by means of wireless connection. The information processing unit is equipped with an operating system (OS). All of the devices constituting the information processing unit 50 are controlled by the operating system.

EXAMPLES

Hereafter, the present invention will be further described in detail referring to specific Examples and Comparative Examples, however, the present invention is not limited to the disclosed Examples.

Examples 1 to 3 and Comparative Example 1

A polycarbonate substrate formed by an injection molding having the following configuration was prepared. Groove depth of 1,670 angstroms, half value width of 0.39 μm, track pitch of 0.74 μm, wobble frequency corresponding to 32T, thickness of 0.6 mm, and outside diameter of 120 mm. A dye compound 1 represented by the following Structural Formula 1 and a dye compound 2 represented by the following Structural Formula 2 were weighed and employed with a weight ratio of 75:25 and then dissolved in a solvent of 2,2,3,3-tetrafluoro-1-propanol. The solution of the dye compounds was applied over a surface of the polycarbonate substrate by a spinner coating method, thereby forming an organic dye layer having a thickness of 750 angstroms on the substrate. Then, the organic dye layer was dried at 90° C. for 30 minutes.

Next, a reflective layer made of Ag having a thickness of 1,100 angstroms was formed on the organic dye layer by a sputtering method, a protective layer made of acrylic photopolymer having a thickness of 5 μm was further formed on the reflective layer, and then a flat polycarbonate substrate having a thickness of 0.6 mm and an outside diameter of 120 mm prepared by an injection molding method was bonded to the protective layer using an acrylic photopolymer to thereby prepare an optical recording medium.

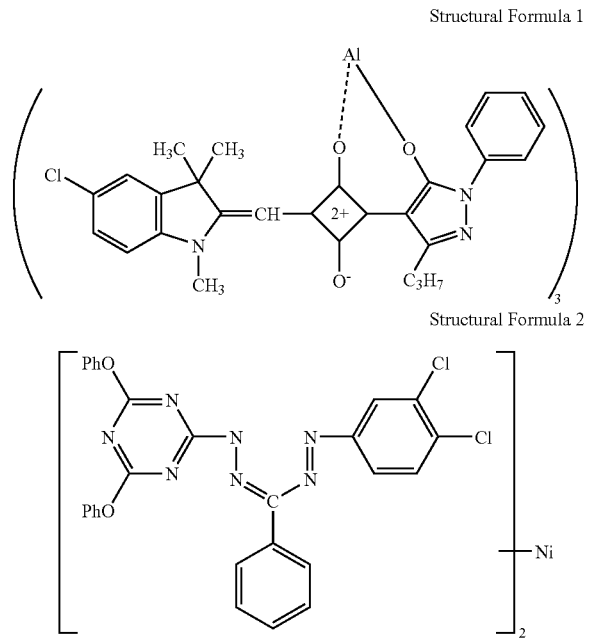

Structural Formula 1

Structural Formula 2

<Recording Conditions>

EFM signals (minimum pit length=about 0.4 μm) were recorded on the obtained optical recording medium using a semiconductor laser beam having an oscillating wavelength of 660 nm and a beam diameter of 0.9 μm while tracking the signals with varying recording powers $P_1$ and $P_2$ so as to satisfy the Expression (1).

As shown in Table 2, Comparative Example 1 shows the recording test result when the recording power ratio $P_1/P_2$, which is commonly used in setting of recording powers, was set to a constant (a=0); and Examples 1 to 3 respectively show the recording test result when the signals were recorded by varying the value "a" and optimizing the value "b". The waveform used for the laser beam in the recording is as shown in FIG. 4. Since the recording power $P_2$ depends on the type of optical recording medium and the type of recording and reproducing apparatus, the recording power $P_2$ was set to a recording power by which the jitter value was minimum (optimum recording power). In the evaluation, the recording powers of $P_0$ and $P_1$ were set to the same value, the optical energy for irradiation of cooling pulse was set to 0.0 mW; and the recording linear velocity was set to 27.9 m/s (recording speed at 8×).

Figure 7:
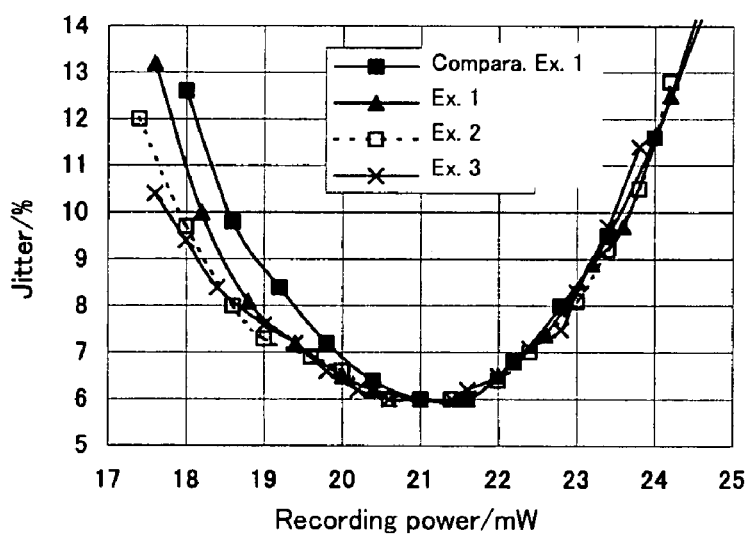
FIG. 7 is a graph showing the measurement results in Examples 1 to 3 and Comparative Example 1.

FIG. 7 shows the measurement results of the recording properties of the respective optical recording media. The measurement results verified that in the optical recording medium of Examples 1 to 3, the recording power margin (allowable recording power range) was widened as compared to the optical recording media prepared based on conventional technologies.

It should be noted that "recording power" along the horizontal scale shown in FIG. 7 is the recording power of "$P_1$".

TABLE 2

|  | a | b |
| --- | --- | --- |
| Compara. Ex. 1 | 0.00 | 1.50 |
| Ex. 1 | 0.01 | 1.64 |
| Ex. 2 | 0.02 | 1.78 |
| Ex. 3 | 0.04 | 2.06 |

Examples 4 to 7 and Comparative Examples 2 to 4

The optical recording media of Examples 4 to 7 and Comparative Examples 2 to 4 were evaluated in the same recording conditions as in Examples 1 to 3 except that the optical energy for irradiation of cooling pulse and the pulse width were changed as described in Table 3. Table 3 also shows the respective jitter values obtained at the optimum recording power. The measurement results shown in Table 3 demonstrated that recording properties of the optical recording media of Comparative Examples 2 and 3 using a cooling pulse power of 0.7 mW and 0.2 mW respectively degraded as compared to the optical recording media of Examples 4, 6, and 7 using a cooling pulse power of 0.0 mW and an optical recording medium of Example 5 using a cooling pulse power of 0.1 mW. The results shown in Table 3 also demonstrated that effect of cooing pulse can be obtained when the cooling pulse width is set so as to be 1/6 to 6/6 as long as the shortest space length (in Comparative Example 2, the cooling pulse width was zero).

TABLE 3

|  | Cooling pulse power | Cooling pulse width relative to the shortest space length | Jitter during recording at 12X |
| --- | --- | --- | --- |
| Compara. Ex. 2 | 0.7 mW | — | 7.5% |
| Compara. Ex. 3 | 0.2 mW | 4/6 | 6.8% |
| Compara. Ex. 4 | 0.0 mW | 13/12 | 8.0% |
| Ex. 4 | 0.0 mW | 4/6 | 6.0% |
| Ex. 5 | 0.1 mW | 4/6 | 6.0% |
| Ex. 6 | 0.0 mW | 6/6 | 6.0% |
| Ex. 7 | 0.0 mW | 1/6 | 6.4% |

Example 8

EFM signals (minimum pit length=about 0.4 μm) were recorded on the following various optical recording media at a recording speed of 12× with varying the value "b" (the value "a" was fixed to 0.01), and the jitter values of the respective optical recording media were measured. Table 4 shows the measurement results. The values (%) shown in Table 4 are jitter values when recording the signals at a recording speed of 12× with the optimum recording power.

As is shown in Table 4, the optimum value "b" varied depending on the type of optical recording medium, and the minimum jitter value could be obtained with the value "b" of 1.3 or more.

Medium 1: DVD+R manufactured by Ricoh Company Ltd.
Medium 2: DVD+R manufactured by TDK Corp.
Medium 3: DVD-R manufactured by Fuji Film Corp.
Medium 4: DVD-R manufactured by RiTEK Corp.

TABLE 4

|  | b value | | | |
| --- | --- | --- | --- | --- |
|  | 1.2 | 1.3 | 1.4 | 1.5 |
| Medium 1 | 10.4% | 9.2% | 8.0% | 6.7% |
| Medium 2 | 7.4% | 6.8% | 6.8% | 7.2% |
| Medium 3 | 8.3% | 7.5% | 6.8% | 6.8% |
| Medium 4 | 9.5% | 8.3% | 7.1% | 7.0% |

Example 9

EFM signals (minimum pit length=about 0.4 μm) were recorded on the optical recording medium used in Example 1 at a recording speed of 8× (27.9 m/s) in accordance with the recording waveform shown in FIG. 4 with varying the value "b" (the value "a" was fixed to 0 (zero)), varying the recording powers $P_1$ and $P_2$ for Comparative Examples 1 to 3 as described below and keeping the $P_1/P_2$ ratio constant to thereby check the recording properties relative to the recording power.

Comparative Example 1: a=0; b=1.5 (same as Comparative Example 1 shown in FIG. 7)
Comparative Example 2: a=0; b=1.6
Comparative Example 3: a=0; b=1.4

Figure 8:
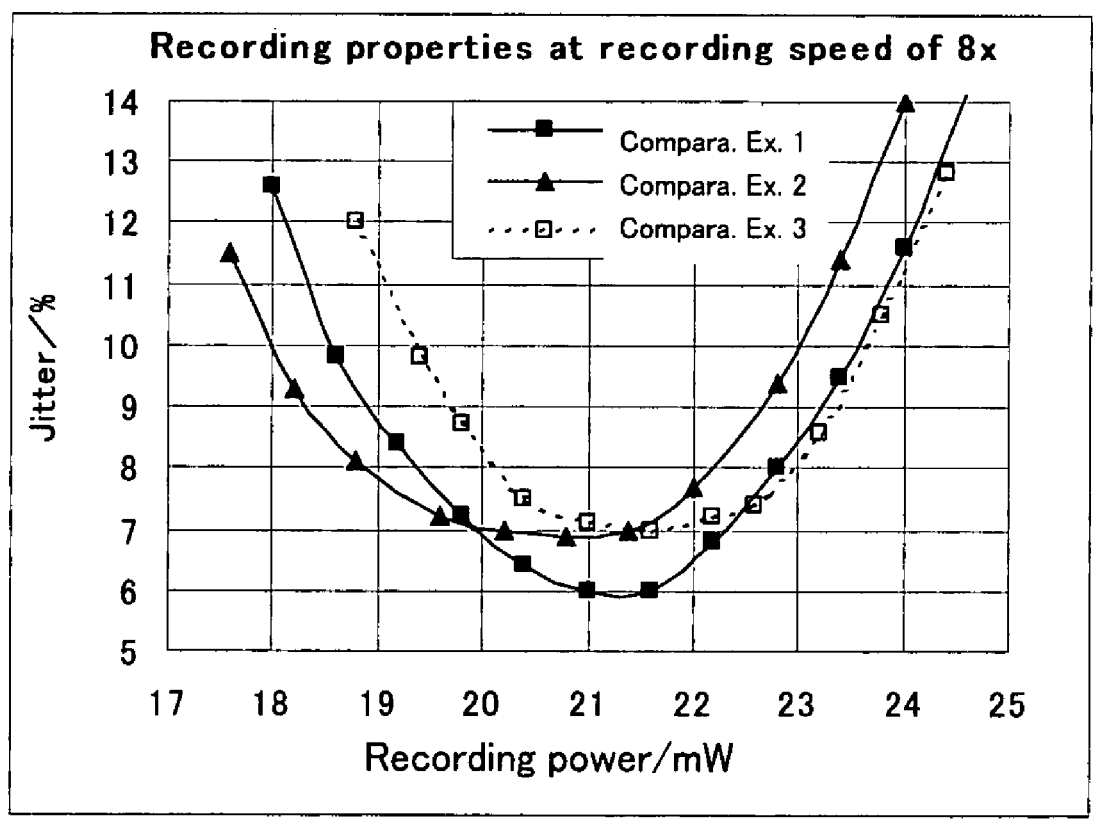
FIG. 8 is a graph showing the measurement results in Comparative Examples 1 to 3.

As shown in FIG. 8, with the $P_1/P_2$ ratio kept constant (a=0), both the minimum jitter value and the recording power margin could not be obtained even when the value "b" was varied. However, when the recording power ratio of Comparative Example 3 (b: small) is used at a high recording power region (22.5 mW or more), the recording power ratio of Comparative Example 2 (b: large) is used at a low recording power region (20 mW or less), and the recording power ratio of Comparative Example 1 (b: medium) is used in the intermediate recording power region therebetween (20 mW to 22.5 mW), varying the recording power ratio with respect to each recording power makes it possible to obtain excellent recording properties and a recording power margin.

It should be noted that "recording power" along the horizontal scale shown in FIG. 8 is the recording power of "$P_1$".

What is claimed is:

1. A recording method for dye-based recordable DVD medium, comprising:

recording shortest marks on a recording layer primarily containing an organic dye, which is formed on a substrate having a guide groove with a wobble formed on a surface thereof, by the use of a simple rectangular wave pulse, recording marks each having the second shortest or still longer mark length by the use of one pulse of which two sites of the front and rear edges are highly energized for a given length of time, and controlling the optical energy for irradiating the rear edge or backwards of the one pulse with a cooling pulse so as to be 0.1 mW or less for a given length of time, wherein when the recording power of the front and rear edges of the pulse used for the marks each having the second shortest or still longer mark length is represented by $P_1$ and the recording power of intermediate pulse between the pulse front edge and the pulse rear edge is represented by $P_2$, marks are recorded while controlling the recording power $P_2$ according to a specific control strategy and controlling the recording power $P_1$ such that the value of $P_1/P_2$ is set to be a greater value provided that the recording power $P_1$ is a low power, and the value of $P_1/P_2$ is set to be a smaller value provided that the recording power $P_1$ is a high power.

2. The recording method for dye-based recordable DVD medium according to claim 1, wherein marks are recorded while controlling the recording power $P_1$ based on $P_1'$ which is derived from the following Expression (1) using the power-controlled recording power $P_2$, $$P_1'=b\times P_2-a\times P_2^2 \qquad \text{Expression (1)}$$

where "a" and "b" are respectively a positive number.

3. The recording method for dye-based recordable DVD medium according to claim 2, wherein the values of "a" and "b" in the Expression (1) are set in a dye-based recordable DVD medium based on control information retrieved from the dye-based recordable DVD medium in which the control information has been stored.

4. The recording method for dye-based recordable DVD medium according to claim 1, wherein the time required to irradiate the rear edges or backwards of the respective pulses with the cooling pulse is controlled to be 1/6 to 6/6 as long as the shortest space length.

5. The recording method for dye-based recordable DVD medium according to claim 1, wherein the pulse width and the leading heating pulse width of a recording pulse for forming a mark of which the space length just before the mark is the shortest are distinguished depending on whether the mark length of the mark of which the space length just before the mark is the shortest is the shortest or not to thereby set the pulse width of a mark having the shortest mark length to be longer than the leading heating pulse width of each mark whose mark length is not the shortest; and the pulse width of a recording pulse for forming the mark having the shortest mark length is distinguished depending on whether the space length just before the mark having the shortest mark length is the shortest or not to thereby set the pulse width of the mark of which the space length just before the mark is the shortest to be shorter than the pulse width of each mark of which the space length just before the each mark is not the shortest.

6. The recording method for dye-based recordable DVD medium according to claim 1, wherein the wobble frequency is a frequency corresponding to 4 T to 96 T when the basic clock cycle is represented by T.

7. The recording method for dye-based recordable DVD medium according to claim 1, wherein the wobble amplitude (Wo) is synchronized with the push-pull amplitude (PP) of a track error detection signal for detecting and controlling track errors using a dual photodetector such that the ratio Wo/PP is in the range of $0.1 \leq Wo/PP \leq 0.4$.

8. The recording method for dye-based recordable DVD medium according to claim 1, wherein the wavelength of the recording light beam is 600 nm to 720 nm.

9. The recording method for dye-based recordable DVD medium according to claim 1, wherein the refractive index "n" and the extinction coefficient "k" of a single-layered recording layer are respectively in the ranges of $1.5 \leq n \leq 3.0$ and $0.02 \leq k \leq 0.2$ relative to a light beam in the wavelength range of the wavelength of the light beam±5 nm.

10. The recording method for dye-based recordable DVD medium according to claim 1, wherein the initial decomposition temperature of the recording layer is 100° C. to 360° C.

11. The recording method for dye-based recordable DVD medium according to claim 1, wherein the dye-based recordable DVD medium further comprises at least one selected from a reflective layer, a protective layer, an adhesive layer, a protective substrate, and a hard coat layer formed on a substrate having the guide groove with the wobble formed on the surface thereof.

12. The recording method for dye-based recordable DVD medium according to claim 11, wherein the reflective layer comprises any one of Au, Ag, and Al, or an alloy containing at least any one of Au, Ag, and Al as the main component.

13. The recording method for dye-based recordable DVD medium according to claim 11, wherein the protective layer comprises an ultraviolet curable resin.

14. The recording method for dye-based recordable DVD medium according to claim 11, wherein the adhesive layer is sandwiched in between two substrates so as to form a recording medium having two substrates, and an adhesive used for the adhesive layer is an ultraviolet curable resin.

15. A recording apparatus for dye-based recordable DVD medium, comprising:
  a first recording unit configured to record shortest marks on a recording layer primarily containing an organic dye, which is formed on a substrate having a guide groove with a wobble formed on a surface thereof, by the use of a simple rectangular wave pulse,
  a second recording unit configured to record marks each having the second shortest or still longer mark length by the use of one pulse of which two sites of the front and rear edges are highly energized for a given length of time,
  a cooling pulse irradiation optical energy controlling unit configured to control the optical energy for irradiating the rear edge or backwards of the one pulse with a cooling pulse so as to be 0.1 mW or less for a given length of time,
  a laser beam irradiation unit configured to irradiate a pulse used for recording marks with a laser beam,
  a pulse outputting unit configured to set recording powers of $P_1$ and $P_2$ and output a pulse to the laser beam irradiation unit based on the set recording powers of $P_1$ and $P_2$ when the recording power of the front and rear edges of the pulse used for the marks each having the second shortest or still longer mark length is represented by $P_1$ and the recording power of intermediate pulse between the pulse front edge and the pulse rear edge is represented by $P_2$, and
  a controlling unit configured to control the pulse outputting unit such that the recording power $P_2$ is set according to a specific control strategy, and the recording power $P_1$ is set so as to set the value of $P_1/P_2$ to be a greater value provided that the recording power $P_1$ is a low power and set the value of $P_1/P_2$ to be a smaller value provided that the recording power $P_1$ is a high power.

16. The recording apparatus for dye-based recordable DVD medium according to claim 15, further comprising a storing unit configured to store the following Expression (1), wherein the controlling unit is configured to assign the value of the controlled recording power $P_2$ to the following Expression (1) which has been read from the storing unit to thereby calculate a recording power $P_1'$; and the pulse outputting unit is configured to set the recording power $P_1$ based on the calculated recording power $P_1'$, $$P_1' = b \times P_2 \times -a \times P_2^2 \quad \text{Expression (1)}$$

where "a" and "b" are respectively a positive number.

17. The recording apparatus for dye-based recordable DVD medium according to claim 16, further comprising a retrieving unit configured to retrieve control information related to the values of "a" and "b" in the Expression (1) from a dye-based recordable DVD medium in which the control information has been stored, wherein the controlling unit is configured to set the values of "a" and "b" based on the retrieved control information.

18. The recording apparatus for dye-based recordable DVD medium according to claim 15, wherein the controlling unit is configured to control the pulse outputting unit such that the time required to irradiate the rear edges or backwards of respective pulses with the cooling pulse is 1/6 to 6/6 as long as the shortest space length.

19. The recording apparatus for dye-based recordable DVD medium according to claim 15, the controlling unit is configured to set the pulse width of a mark having the shortest mark length to be longer than the leading heating pulse width of each mark whose mark length is not the shortest by distinguishing the pulse width and the leading heating pulse width of a recording pulse for forming a mark of which the space length just before the mark is the shortest depending on whether the mark length of the mark of which the space length just before the mark is the shortest or not; and set the pulse width of the mark of which the space length just before the mark is the shortest to be shorter than the pulse width of each mark of which the space length just before the each mark is not the shortest by distinguishing the pulse width of a recording pulse for forming the mark having the shortest mark length depending on whether the space length just before the mark having the shortest mark length is the shortest or not.

20. A dye-based recordable DVD medium, comprising:
  a substrate having a guide groove with a wobble formed on a surface thereof, and
  a recording layer primarily containing an organic dye, being formed on the substrate,
  wherein the dye-based recordable DVD medium is preformatted with information to carry out a recording method which comprises recording shortest marks on a recording layer primarily containing an organic dye, which is formed on a substrate having a guide groove with a wobble formed on a surface thereof, by the use of a simple rectangular wave pulse; recording marks each having the second shortest or still longer mark length by the use of one pulse of which two sites of the front and rear edges are highly energized for a given length of time; controlling the optical energy for irradiating the rear edge or backwards of the one pulse with a cooling pulse so as to be 0.1 mW or less for a given length of time; and when the recording power of the front and rear edges of the pulse used for the marks each having the second shortest or still longer mark length is represented by $P_1$ and the recording power of intermediate pulse between the pulse front edge and the pulse rear edge is represented by $P_2$, marks are recorded while controlling the recording power $P_2$ according to a specific control strategy and controlling the recording power $P_1$ such that the value of $P_1/P_2$ is set to be a greater value provided that the recording power $P_1$ is a low power, and the value of $P_1/P_2$ is set to be a smaller value provided that the recording power $P_1$ is a high power.

* * * * *